United States Patent [19]
Nuila

[11] Patent Number: 5,944,231
[45] Date of Patent: *Aug. 31, 1999

[54] FERTILIZER OR LIKE DRY MATERIAL DISPENSING ASSEMBLY AND DISPENSING GUN THEREFOR

[76] Inventor: Jorge Arturo Nuila, 444 Brickell Ave., Suite 51-373, Miami, Fla. 33131

[*] Notice: This patent is subject to a terminal disclaimer.

[21] Appl. No.: 08/570,375

[22] Filed: Dec. 11, 1995

Related U.S. Application Data

[63] Continuation of application No. 08/294,563, Aug. 23, 1994, abandoned, which is a continuation-in-part of application No. 07/966,687, Oct. 26, 1992, Pat. No. 5,339,994, which is a continuation-in-part of application No. PCT/US92/01465, Feb. 25, 1992, which is a continuation-in-part of application No. 07/659,615, Feb. 25, 1991, abandoned.

[51] Int. Cl.$^6$ ........................................................ B67D 5/64
[52] U.S. Cl. ........................ 222/175; 222/449; 222/451; 111/95; 224/658
[58] Field of Search .................................. 222/175, 444, 222/447, 449, 451, 434–440, 482, 465.1, 540; 111/7.2, 95, 170; 224/148.7, 153, 209, 210, 213, 658

[56] References Cited

U.S. PATENT DOCUMENTS

| | | | |
|---|---|---|---|
| 249,464 | 11/1881 | Farnham | 222/447 |
| 260,373 | 7/1882 | Erwin . | |
| 346,718 | 8/1886 | Capewell | 222/451 |
| 448,275 | 3/1891 | Stowell . | |
| 454,117 | 6/1891 | Myers | 239/154 |
| 541,417 | 6/1895 | Barnhill . | |
| 714,051 | 11/1902 | Spitzenberg | 239/652 |

(List continued on next page.)

FOREIGN PATENT DOCUMENTS

| | | | |
|---|---|---|---|
| 1 153 083 | 7/1959 | France . | |
| 602 324 | 2/1960 | Italy . | |
| 883371 | 11/1961 | United Kingdom | 222/175 |

*Primary Examiner*—Philippe Derakshani
*Attorney, Agent, or Firm*—Hill & Simpson

[57] ABSTRACT

A dispenser assembly particularly adapted to selectively dispense predetermined amounts of dry fertilizer or other dry material onto an area of disbursement, such as a plant, and including an elongated dispensing conduit having a holding chamber of predetermined dimension connected thereto along with a control mechanism such that selective operation of the control mechanism will automatically dispense, by gravity, a premeasured amount of dry material onto the disbursement area. A double disk valve mechanism is provided having an inlet valve and an outlet valve simultaneously translatable to open one end of the holding chamber and close the respective other end. In an embodiment, the outlet valve is selectable from a plurality of valve plates to vary the dispensing amount. A gun-shaped valve mechanism is provided as the control mechanism in a preferred embodiment.

25 Claims, 8 Drawing Sheets

U.S. PATENT DOCUMENTS

| | | |
|---|---|---|
| 784,682 | 3/1905 | Jones . |
| 967,096 | 8/1910 | Wood . |
| 1,061,057 | 5/1913 | Etheridge . |
| 1,282,194 | 10/1918 | Combs . |
| 1,361,146 | 12/1920 | Egnatoff . |
| 1,633,343 | 6/1927 | Miller . |
| 1,648,481 | 11/1927 | Hollenback . |
| 1,768,091 | 6/1930 | Adair . |
| 1,793,197 | 2/1931 | Speicher . |
| 1,844,260 | 2/1932 | Nicolino ................................. 222/447 |
| 1,857,734 | 5/1932 | Moldovan et al. . |
| 1,891,038 | 12/1932 | Barros . |
| 1,894,157 | 1/1933 | Campbell . |
| 1,931,385 | 10/1933 | Hawes . |
| 1,976,340 | 10/1934 | Gretschel . |
| 2,041,887 | 5/1936 | Ward . |
| 2,187,868 | 1/1940 | Sweitzer . |
| 2,221,113 | 11/1940 | Schmitt . |
| 2,224,540 | 12/1940 | Fraser . |
| 2,232,571 | 2/1941 | Stark . |
| 2,239,464 | 4/1941 | Moger ..................................... 222/175 |
| 2,545,178 | 3/1951 | Vaughn ................................... 222/540 |
| 2,561,578 | 7/1951 | Koester ................................... 222/527 |
| 2,599,118 | 6/1952 | McMillan . |
| 2,630,247 | 3/1953 | Rafferty . |
| 2,707,068 | 4/1955 | Williamson . |
| 2,837,250 | 6/1958 | Hagman . |
| 3,227,313 | 1/1966 | Morena ................................... 222/436 |
| 3,945,571 | 3/1976 | Rash . |
| 4,109,835 | 8/1978 | Castro . |
| 4,407,434 | 10/1983 | Kempf . |
| 4,801,088 | 1/1989 | Baker ..................................... 222/175 |
| 4,923,098 | 5/1990 | Schoonover et al. .................... 222/482 |
| 4,925,105 | 5/1990 | Lin .......................................... 222/175 |
| 5,020,725 | 6/1991 | Waldrum . |
| 5,339,994 | 8/1994 | Nuila ...................................... 222/175 |
| 5,503,090 | 4/1996 | Guzan ..................................... 222/175 |

FERTILIZER OR LIKE DRY MATERIAL DISPENSING ASSEMBLY AND DISPENSING GUN THEREFOR

This is a continuation, of application Ser. No. 294,563, filed Nov. 21. 1995, abandoned, which is a continuation-in-part of U.S. Ser. No. 07/966,687 filed Oct. 26, 1992, and issued as U.S. Pat. No. 5,339,994, Aug. 23, 1994, which is a continuation in-part of PCT/US92/01465 filed Feb. 25, 1992 which is a continuation-in-part of U.S. Ser. No. 07/659, 615, filed Feb. 25, 1991 abandoned.

BACKGROUND OF THE INVENTION

1. Field of the Invention

A dispenser assembly designed to dispense fertilizer or like dry material, by gravity flow, through selective manipulation of a control mechanism by the operator of the assembly.

2. Description of the Prior Art

In the agricultural industry, it is, of course, well recognized that proper fertilization must occur in order to render the commercial growing of a given crop feasible. It is also well accepted that the dispensing of the fertilizer properly onto the given crop must be done accurately and in an effective manner to guarantee that the entire crop is properly fertilized.

In the growing of certain crops, particularly in the South American and Latin American countries, it is the practice to utilize a large labor force and through such use fertilize successively each of an extremely large number of plants individually. In accomplishing such fertilizer distribution, it has been found in the past that the fertilizer was normally sprayed onto the plant area after the fertilizer was mixed or blended with a predetermined amount of water. Problems in both time and expense were encountered due to the fact that large amounts of water, as well as the fertilizer itself, had to be transported to what may be considered generally remote areas where the crops were growing. In the aforementioned geographic locations, numerous agricultural areas involved transporting such supplies over mountainous areas. Individual members of the labor force, therefore, had to carry not only the fertilizer but were burdened with the weight of the water mixed with the fertilizer. Based on the above prior art and generally well-known techniques, an extremely large labor force was required and a relatively great amount of time was consumed in accomplishing fertilization. An additional problem associated with such prior art techniques was that the individual crops had to be fertilized more than one time during a growing season.

Based on the above, there is a recognized need in the agricultural industry for the fertilization of individual plants on an independent basis utilizing an assembly which will effectively eliminate the need for mixing the dry and normally particulate fertilizer material with water in order to accomplish an even dispersal of the fertilizer mixture onto the plant. Preferably, such a preferred dispenser assembly would automatically "measure" predetermined amounts of fertilizer in dry, particulate form and through operation of a relatively simple control mechanism dispense the predetermined amounts of premeasured fertilizer directly onto the plant area or other desired area of disbursement.

SUMMARY OF THE INVENTION

The present invention relates to a dispenser assembly primarily designed for use in dispensing fertilizer onto individual plants or other disbursement areas. It should be emphasized, however, the subject dispenser assembly can be used for the dispensing of other materials, particularly dry particulate material wherein the particulate material to be dispensed is prone to gravity flow. The subject dispenser assembly comprises a container having a hollow interior of sufficient dimension to hold sufficient quantity of dry material being dispensed. A mounting means, preferably in the form of shoulder straps or like body harness, is connected to exterior portions of the container and, as set forth, is adapted to mount the container on the back of a laborer or user. It is, of course, to be noted that the dimension and configuration of the container and the structure of the mounting harness is such as to provide maximum comfort to the carrier, taking into consideration load restrictions and weight and content of the material to be dispensed. Also, the mounting harness should be fashioned to comfortably fit both short and tall laborers.

A dispensing means is attached to the container and is generally in the form of an elongated conduit. The dispensing conduit has an inlet end connected or communicating with an outlet located at the bottom of the container. The opposite end of the conduit is defined by a free end which is opened so as to allow the dry material to pass therefrom. In a preferred embodiment, to be described in greater detail hereinafter, the conduit means is formed at least in part from a flexible material or is connected to the container by some type of flexible or movable joint so that positioning of the conduit relative to the container can easily occur by the carrier. This allows the "pointing" or aiming of the exit, free end of the conduit directly onto an area of disbursement. The area of disbursement may, in fact, be the roots or trunk of the individual plant or plants being fertilized. Further, the entire dispenser assembly is designed to operate by gravity flow of the dry, particulate material from the interior of the container, along the length of the conduit and out of the exit end thereof.

The dispensing means further comprises what may be considered a holding chamber mounted between the inlet and exit ends of the conduit means and defining a portion of its length. The holding chamber has a hollow interior and may be generally cylindrical in form. The opposite ends of the holding chamber are opened so as to allow passage therethrough of the dry, particulate material upon physical manipulation of a control mechanism associated with the holding chamber.

The holding chamber itself may vary in dimension and configuration such that successive, predetermined quantities of the dry material or fertilizer are individually dispensed onto different ones of a plurality of plants, as will be explained in greater detail hereinafter. It should further be noted that the holding chamber is removably attached to the conduit means, thereby enabling any one of a plurality of different chambers to be mounted on the holding means in an operative fashion. The user of the subject dispenser assembly may want to vary the quantity of the individual amounts of the fertilizer to be dispensed depending upon the particular crop or plant needed to be fertilized. Therefore, the holding chambers may, in fact, be replaced by other holding chambers of different sizes which are designed to hold different quantities.

Portions of the conduit can be made of transparent material or be provided with a sight glass for monitoring the flow of particulate material.

The aforementioned control mechanism includes a valve means operable by and defining as part thereof a control lever. The valve means preferably includes a first and second valve plate attached in spaced apart relation along the length of a control lever. Disposition of the valve plates and selective movement of the valve lever into and out of a dispensing position serves to independently position one of the valve plates into a flow-blocking position relative to the dry material passing through the interior of the holding chamber. The control lever is normally biased into what may be defined as a "closed position".

The closed position in turn may be defined by a first or downstream valve plate disposed within the interior of the holding chamber into a flow-blocking position. Depression or other preselected manipulation of the valve lever into a dispensing position will serve to concurrently remove the first or downstream valve plate from the interior of the holding chamber and position the second or upstream valve plate into a flow-blocking position. This will open what may be referred to as an outlet end of the holding chamber and allowing the interior of the holding chamber to communicate with the exit end of the conduit. The orientation of the entire conduit, including the holding chamber, into a downwardly oriented position will allow gravity flow of the dry material from the interior of the container through the free exit end of the conduit and outwardly therefrom onto the area of disbursement which may be directly onto the plant to be fertilized.

Subsequent positioning of the control lever to a closed position will again reposition the first or downstream valve plate into a flow-blocking position, and concurrently remove the upstream or second valve plate from the interior of the holding chamber. This will then allow free communication and material flow from the container through the upper portion of the conduit into the interior of the holding chamber so as to fill the holding chamber with a predetermined amount of dry material, depending upon the overall size of the interior of the holding chamber. This amount can then be dispensed by again depressing or otherwise positioning the control lever into the aforementioned and defined dispensing position.

Additionally, the present invention provides a new and useful dispensing valve for dispensing any type material. In particular, a double valve dispenser is disclosed in the Figures and description which utilizes a trigger action or an easily gripped handle configuration which provides for a quick and effective dispensing. Thus, the valve means described can be utilized not only in the agricultural fields, but for dispensing other commodities such as laundry detergent in the home or bulk materials in a store, such as candy, flour, sugar, coffee or any other use where a successive controlled dispensing is required.

An additional embodiment provides a gun-shaped dispensing valve having a plurality of valve plates which can be selectively activated to vary the holding chamber volume. By moving a selection rail to a select position, one valve plate is activated and others are deactivated. By then squeezing the trigger lever, the selected valve plate is opened downstream and a shut off valve upstream is closed and dispensing of the holding chamber occurs. Returning the trigger lever to a relaxed condition closes the selected valve and opens the shut off valve to refill the holding chamber. A select position of the rail can also deactivate all valve plates except the shut off valve. The dispensing valve can then be used as a "manual" dispenser, wherein upon squeezing the trigger lever, material is dispensed until the trigger lever is released.

The present invention provides a back mounted fertilizer container which is ergonomically contoured to comfortably fit a laborer's back. It provides a harness which is easily drawn tight to fit both short and tall workers. The harness provides a plurality of latching positions on the container for the straps. A three point harness attachment can be provided for mounting the container at an elevated position on the laborer's back.

DETAILED DESCRIPTION OF THE PREFERRED EMBODIMENT

Figures 1, 3, 4:
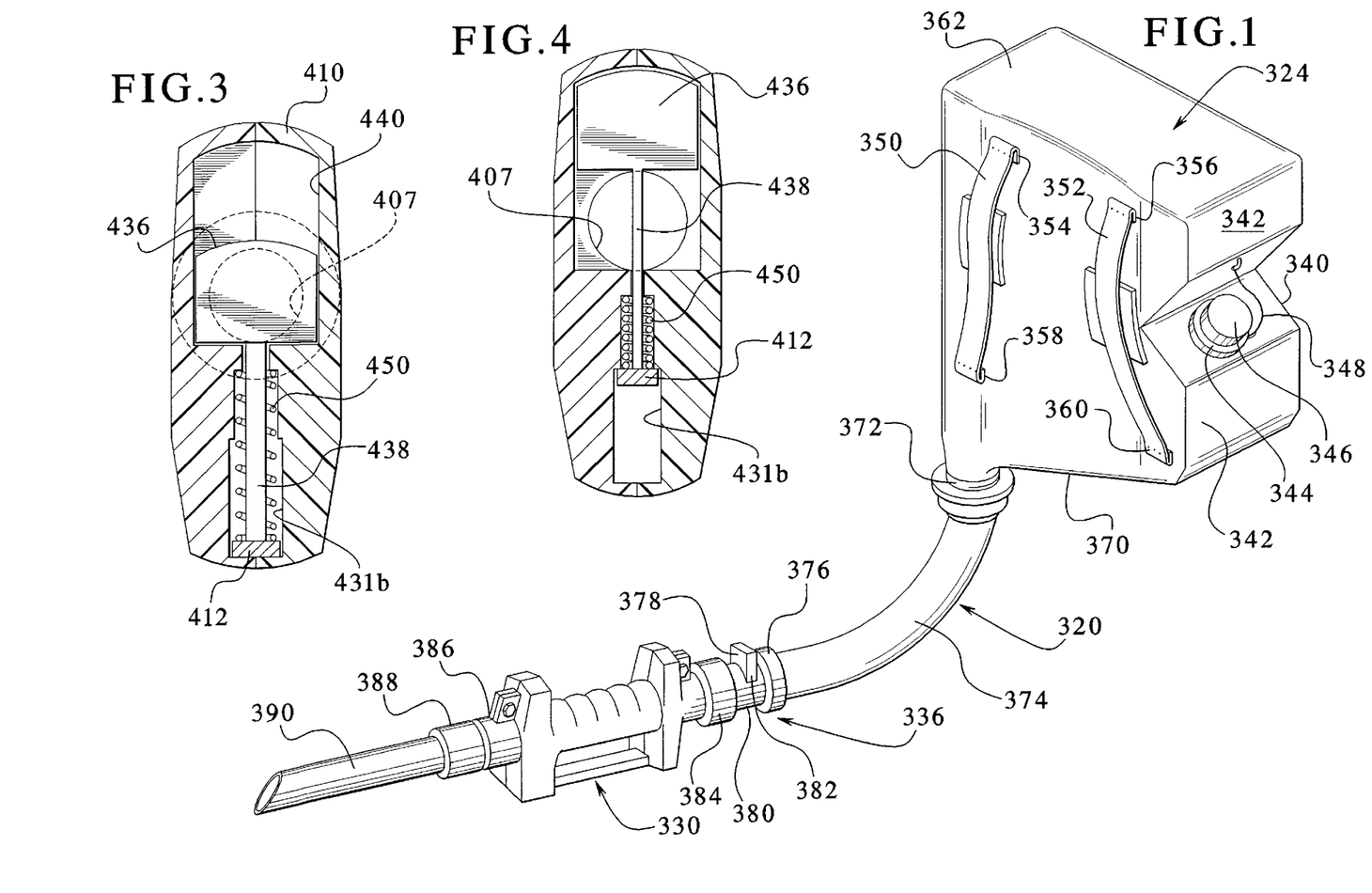
FIG. 1 is a perspective view of an embodiment of the present invention.
FIG. 3 is a sectional view taken generally along III—III of FIG. 2.
FIG. 4 is a sectional view taken generally along III—III of FIG. 2 with the valve in an open condition.

FIG. 1 shows an embodiment to the apparatus of the invention. In this embodiment an advantageously shaped container 324 and a valve means 330 are connected via an outlet hose 374 for dispensing fertilizer or other materials. Additionally, a switch over valve 336 is utilized. The container uses a notch 340 formed in a side 342 of the container 324 for locating the fill nozzle 344 recessed from the side 342. The fill nozzle 344 has a cap 346 connected to the side 342 by a tether 348. Padded shoulder straps 350, 352 are used for holding a container 324 on the back of a worker. The shoulder straps 350, 352 are engaged to the container 324 with recessed loops 354, 356, 358, 360 respectively. A top surface 362 of the container 324 is thereby flat, having no nozzle protruding therefrom. Also, the surface of the side 342 split by the notch 340, is also flat. These flat sides provide for compact storage of a plurality of the containers 324 for example in a truck. The container also provides a sloping floor 370 from the side 342 down to an outlet nozzle 372 which is connected to an outlet hose 374.

The outlet hose 374 is connected to the switch over valve 336 such as by a screwed fitting 376. The switchover valve 336 provides a gate 378 which can be manually slid downward into the body 380 of the valve to close the valve in a guillotine fashion, and can be lifted upward to thereafter open the valve. The gate 378 fits tightly within a slot 382 in the body 380. Connected to the valve 336 by a screwed coupling 384 is the valve means 330. Connected to an outlet 386 of the valve means 330 by screwed coupling 388 is an outlet distribution tube 390. It follows from FIG. 1 that the valve means 330 can be removed without spillage after the closing of the switchover valve 336 and a different size valve means 330 can be installed. A different size distribution tube 390 can be installed simultaneously therewith or a different size distribution tube 390 can be installed into the same valve means for changing the rate of flow of solid material being scattered from the apparatus.

Figures 2, 8:
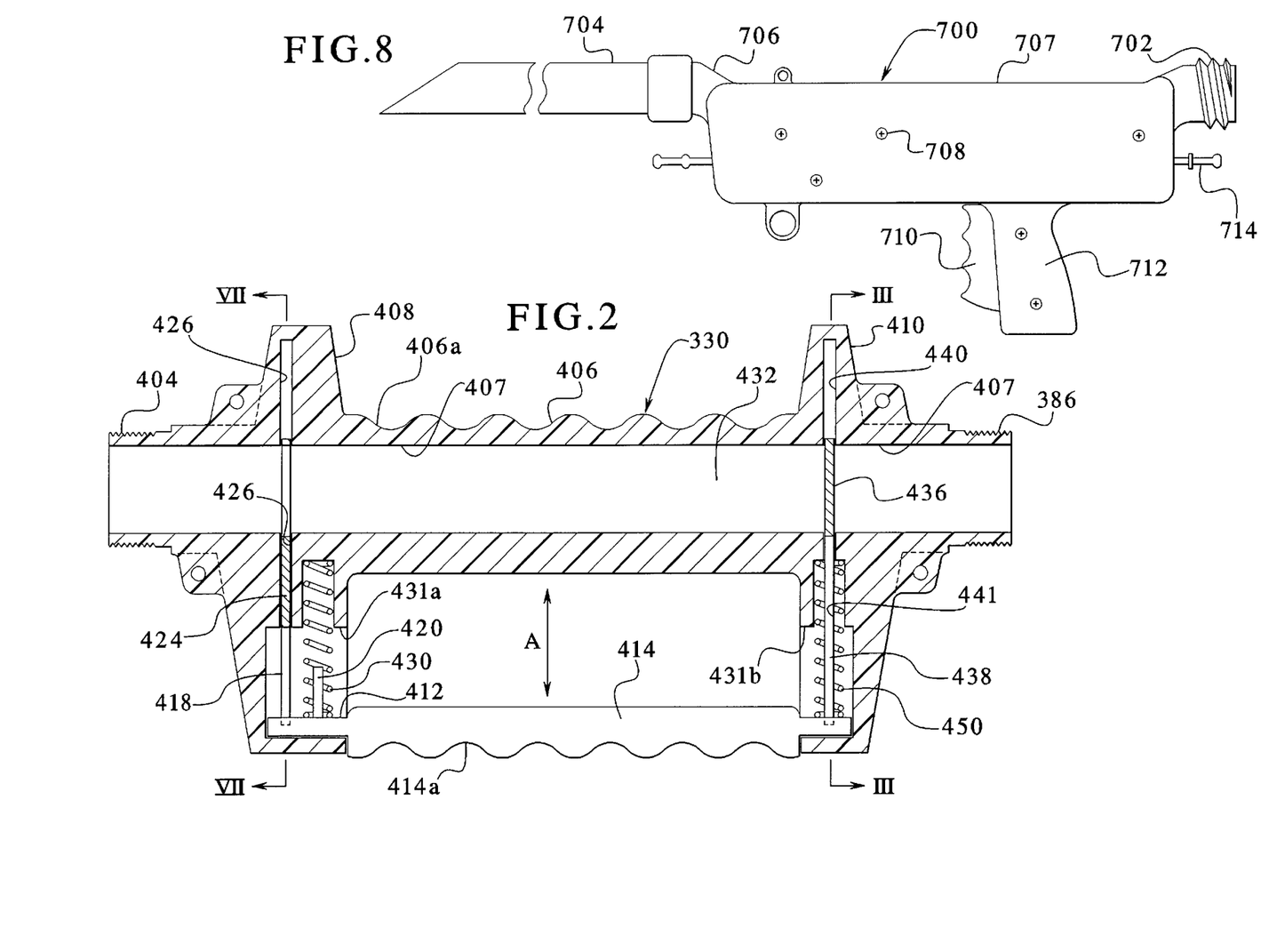
FIG. 2 is a sectional view of a valve means of FIG. 1.
FIG. 8 is an elevational view of an alternate valve means of the present invention.

FIG. 2 shows the valve means 330 of the apparatus of FIG. 1. The valve means 330 comprises the outlet end 386 for connecting to the distribution tube 390, and an inlet end 404 for connecting to an upstream conduit or directly to a container holding the material to be dispensed (not shown). The valve means 330 also provides a tubular body 406 with an axial channel 407 and expanded upwardly and downwardly at an inlet valve region 408 and an outlet valve region 410. Bridging between the inlet valve region 408 and the outlet valve region 410 is a bar 412. Surrounding the bar is a handle gripping portion 414. Within the inlet valve region 408 is arranged a spindle 418 and a spring stud 420. The spindle 418 holds thereon a disk 424. The disk 424 is sized and shaped to be able to block the channel 407. The spindle 418 and the disk 424 proceed through a slot 426 in the tubular body member 406. The spring stud 420 provides a mechanical means for which to mount a spring 430 between tubular body 406 and the bar 412. The disk 424 can occupy two positions depending on the position of the bar 412.

The bar 412 can be translated in the direction A through slots 431a, 431b in each of the valve regions 408, 410. A lower position as shown in FIG. 2 would retract the disk 424 from the channel 407 and allow material to pass from the inlet end 404 into a central volume 432 of the channel 407. When the disk and the spindle 418 are translated upward according to FIG. 2 the disk 424 is placed in the position to block entrance between the inlet 404 and the central volume 432. The disk 424 is shaped to cover the cross sectional open area of the channel 407.

The body 406 and handle 414 have finger contoured outside surfaces 406a, 414a, for ease of handling in use.

At the outlet valve region 410, a second disk 436 is mounted to a second spindle 438. The second disk 436 is shown blocking flow from the central volume 432 to the outlet 386. When the bar 412 is pressed toward the body 406, the disk 436 and the second spindle 438 are translated upwardly, according to FIG. 10, within a slot 440 formed in the tubular body 406. Below the disk 436 on the spindle 438 is an aperture or an open region 441. The central volume 432 is thus opened to the outlet 386 and the material can be dispensed.

The second spindle 438 also serves as a spring stud in that a second spring 450 can be mounted therearound to bias the bar 412 away from the body 406.

The valve means 330 can be mounted directly to a container having a supply of dry material therein. The assembly can be arranged in a vertical configuration for gravity flow. Such a dispensing arrangement could be used for dispensing laundry detergent or any other bulk material where measured successive amounts need to be dispensed. The valve means could incorporate a coin fed interlock to sell the successively dispensed amounts.

FIG. 3 shows the outlet valve region 410. In FIG. 3 the disk 436 is in a closed position, blocking the channel 407. The second spring 450 is shown, as per FIG. 2 to be in a somewhat relaxed state.

FIG. 4 shows the handle 412 being displaced upwardly and compressing the spring 450. The spindle 438 has extended the disk 436 up past the channel 407. Thus, substantially all of the channel 407 is now open, except for the profile of the spindle 438.

Figure 5:
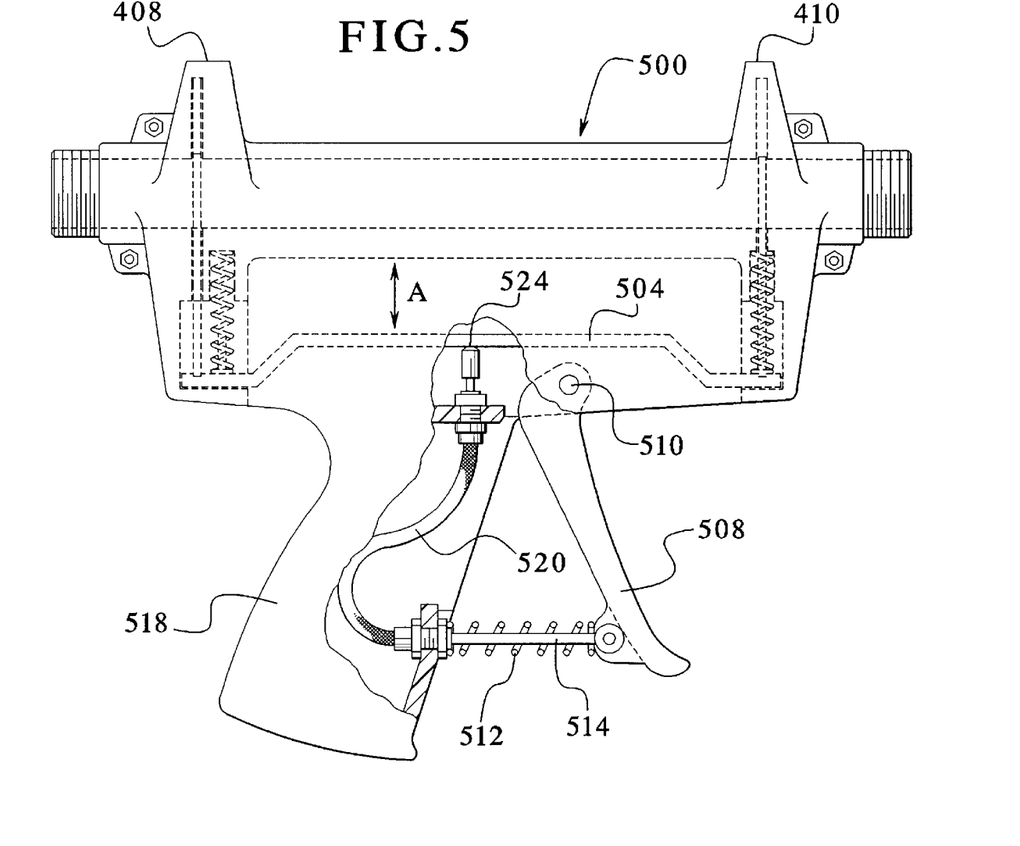
FIG. 5 is an elevational view of alternate embodiment of a valve means.

FIG. 5 shows a further embodiment of a valve means 500. This valve means has an easy to use gun shape. The valve means is similar to the valve means 330 of FIG. 2 except that a bar 504 is translated in the direction A via a compression cable arrangement. A pivotable handle 508 is mounted for rotation about a pin 510 on the valve means 500. At a bottom end of the handle 508 is mounted a spring 512 to bias the handle 508 in an outward direction. Mounted coaxially within the spring is a compression cable 514 which enters a handle 518 of the valve means 500. Within the handle 518 is mounted a cable sleeve 520 which extends upward to a position below the bar 504. The cable 514 protrudes outwardly of the sleeve 520 and is connected via a joint 524 to the bar 504. Thus, by pivoting the handle 508 inwardly toward the handle 518, the compression cable 514 proceeds through the cable sleeve 520 and exerts an upward force on the bar 504 to translate the bar in a direction A. The inlet valve region 408 and outlet valve region 410 including the spindles, springs, spring studs, and discs located therein can function identically to the embodiment of FIG. 2.

Figure 6:
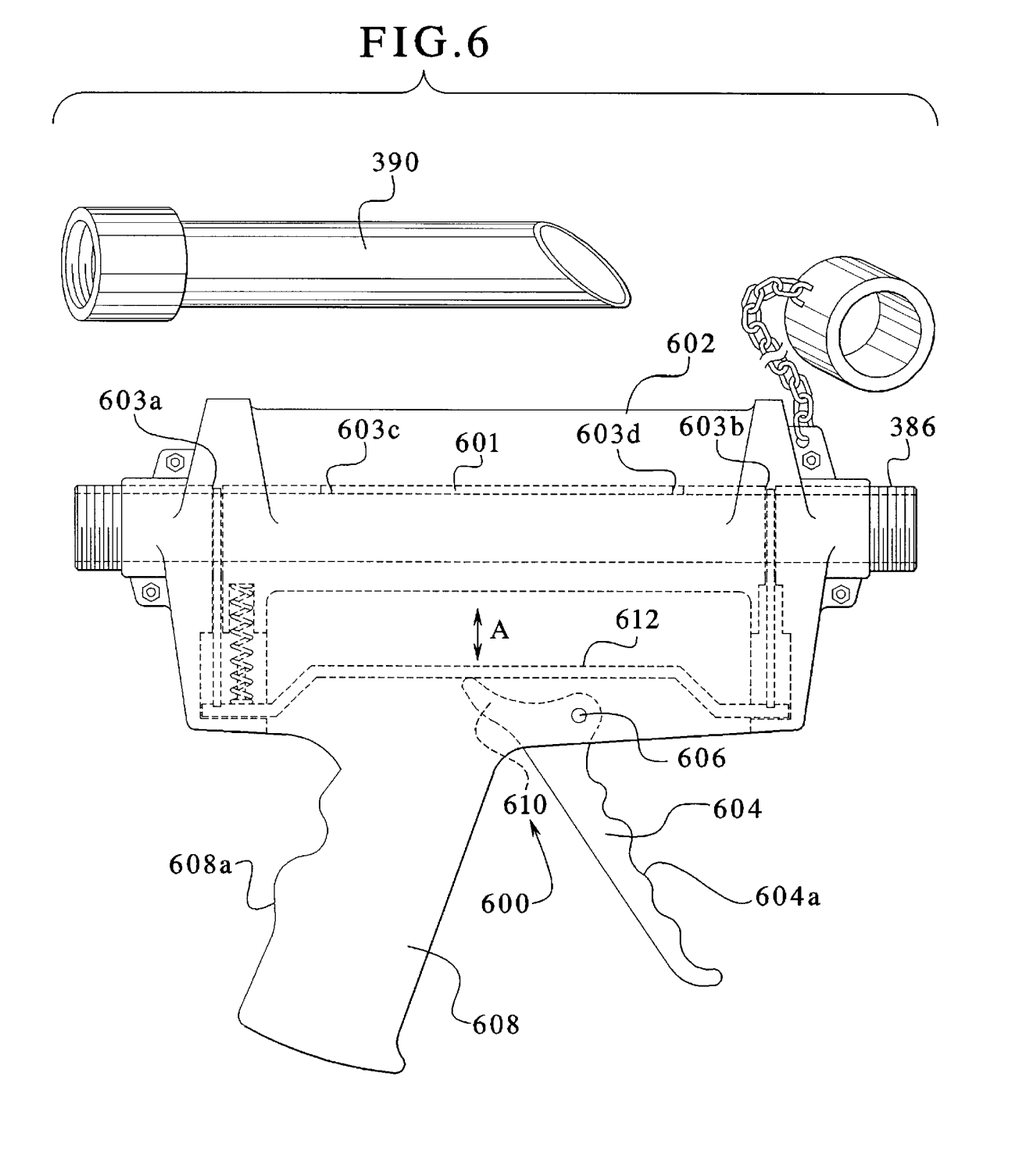
FIG. 6 is an elevational view of a further embodiment of a valve means.

FIG. 6 shows an additional gun shaped embodiment of the valve means 600 wherein the inlet valve regions 408 and the outlet valve region 410, as well as the spindles, discs, springs and spring studs can function identically to that of FIG. 2. However, rather than slots extending upward above the channel 407, the body is in the form of a pipe portion 601 and an overlying casing 602. Slots 603a, b are cut through the pipe portion 601 of the protrusion upward of the disks. Additionally, weakened slot outlines 603c, d or more can be provided during manufacture to convert the valve means 600 at a future date to have a smaller dispensing volume between the disks. The outlines would then be punched out to fit in new disks and if necessary, a new bar. A lever or trigger 604 is provided mounted for pivoting motion about a pin 606 toward a handle 608 of the valve means 600. A base end of the lever 604 comprises an offset cam portion 610 which is pressable against a bar 612 to translate the bar 612 in the direction A to activate the valve means. This occurs when the lever 604 is gripped and squeezed against the handle 608.

As shown in FIG. 6, the distribution tube 390 is screwed onto the outlet end 386 and can be sized in diameter to increase or decrease the dispensing speed and dispersion of the solid material. The distribution tube 390 can comprise a ¾" tube wherein the outlet end 386 is a one inch tube. The distribution tube 390 can alternately be a full size one inch tube.

Figure 7:
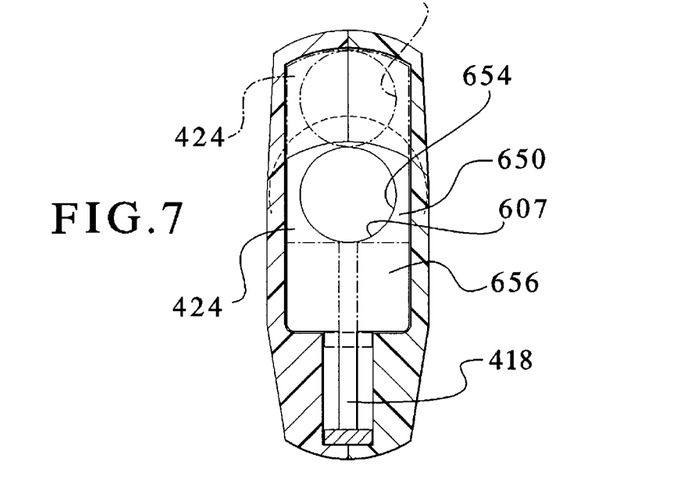
FIG. 7 is a sectional view taken generally along line VII—VII of FIG. 2.

FIG. 7 shows the inlet valve region 408 in more detail. The disk 424 comprises an upper region 650 having an aperture 654 which registers with the channel 407 to permit flow therethrough. A lower solid portion 656 of the disk 424 is solid and has a surface area sized to cover the channel 407. In the dashed configuration the disk 424 has been raised and the aperture 654 has come out of registry with the channel 407 and the solid portion 656 now covers the channel 407. The outlet valve region can be configured similarly except with the upper region 650 and the lower portion 656 reversed so that upward movement of the spindle places the aperture 654 in registry with the channel 407.

The handle 608 and the trigger 604 can have finger gripping contoured surfaces 608a, 604a respectively, as can any of the valve means embodiments described herein.

FIG. 8 shows a further embodiment of a valve means 700 attachable at a screwed nozzle 702 to the hose 374 such as shown in FIG. 1. At an outlet end a distributor pipe 704 is screw connectable to an outlet nozzle 706 of the valve means. The valve means 700 includes a housing 707 which is constructed to be split longitudinally and assembled via a plurality of screws 708. The valve means provides a trigger 710 which is recessable into a handle 712. A selection rail 714 penetrates the housing 707 lengthwise and protrudes from opposite ends thereof.

Figure 9:
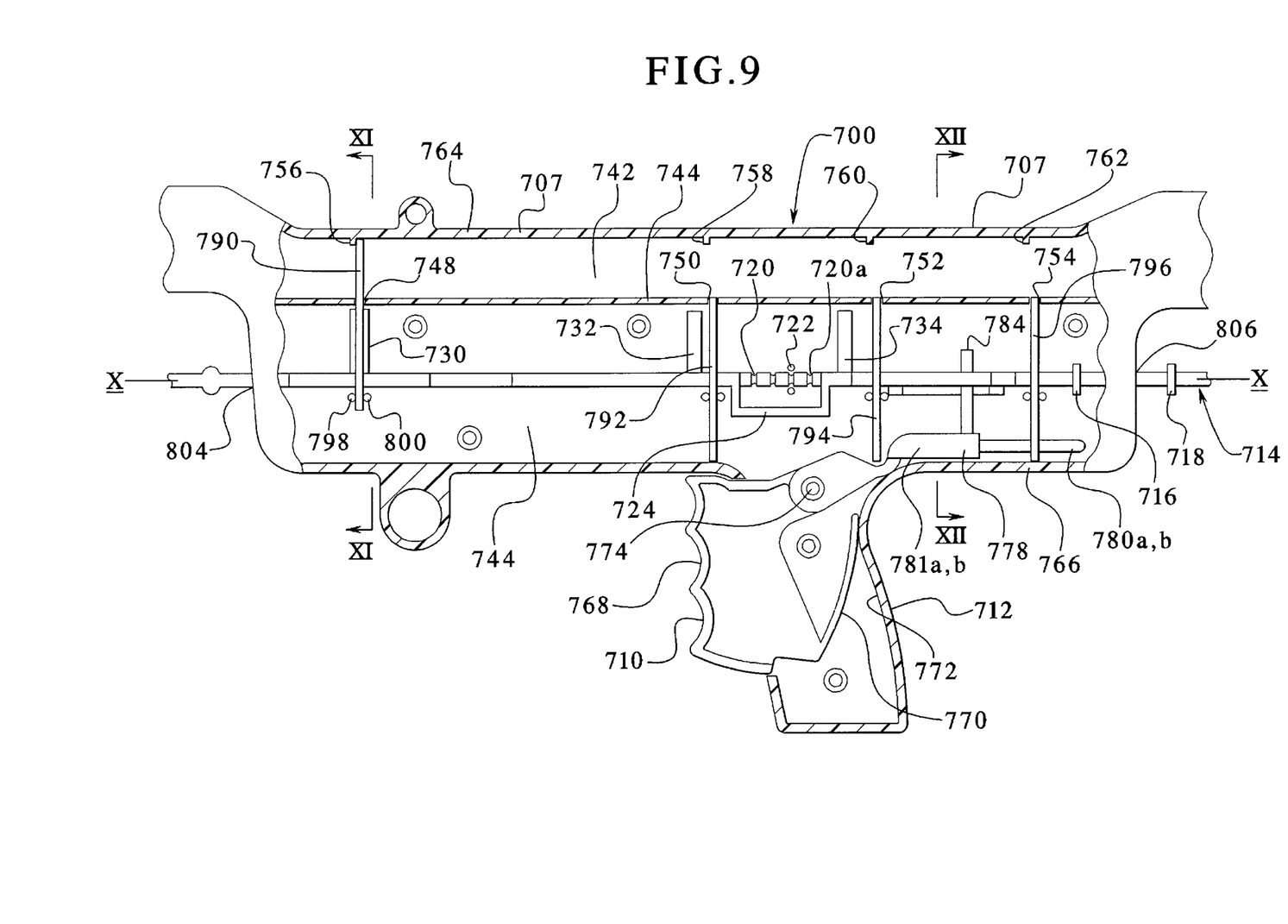
FIG. 9 is a partial sectional view of the valve means of FIG. 8 with the valve means in a closed condition.

FIG. 9 illustrates the functioning of the valve means 700. The rail 714 is movable axially through the housing and restricted by stops 716, 718 from being retracted entirely from the housing 707. At a generally central location the rail 714 provides annular notches 720 around a rod portion 721 representing four axial positions of the rail 714 with respect to a clasp 722 fixed in position to the housing 707. A structural tie bar, located in parallel to the rod portion 721 strengthens this area of the rail 714.

Figure 10:
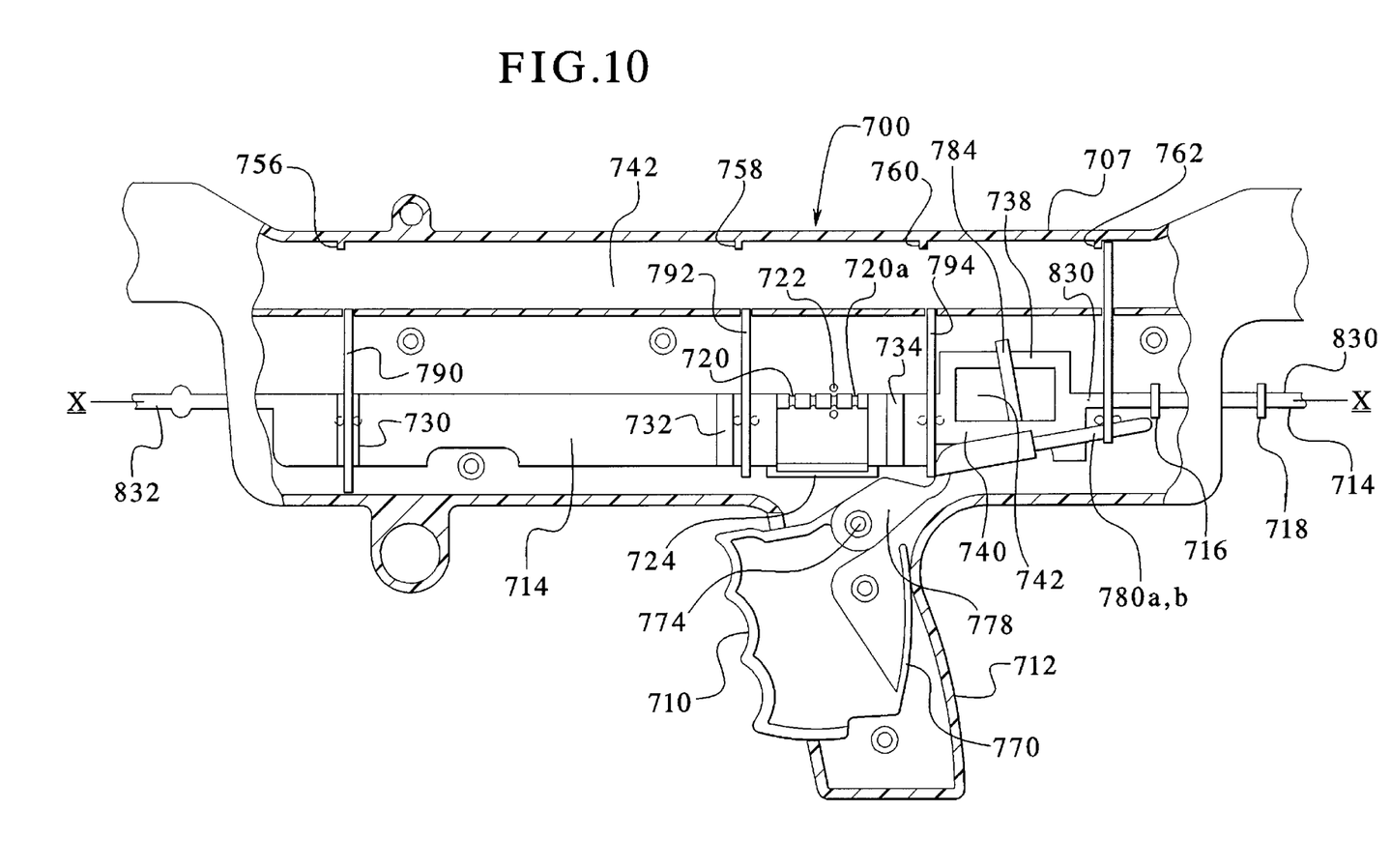
FIG. 10 is a partial sectional view of the valve means of FIG. 9 with the valve means in a discharge condition.

The rail 714 pivots about an axis X—X as shown in FIG. 9 and FIG. 10. Connected to the rail 714 are first, second and third cams 730, 732, 734. The rail 714 provides a offset crank bar 738 parallel with a structural tie 740 leaving a rectangular space 742 therebetween along the length of the rail 714.

The housing 707 is divided into an upper rectangular flow channel 742 and a lower mechanism chamber 744. A bottom wall 744 of the upper flow channel provides axially spaced slots 748, 750, 752, 754. Seal bars 756, 758, 760 and 762 are arranged on a top wall 764 of the flow channel 742 located adjacent each slot.

The mechanism chamber 744 extends from a bottom wall 766 thereof into the handle 714. The trigger 710 is recessable into the handle 712. The trigger 710 provides finger contours 768 on a front side thereof. The trigger 710 provides a leaf spring 770 pressed against a back wall 772 of the handle 712. The trigger 710 is pivotable about a pin 774, the pin molded integrally with the mechanism chamber 744. Extending rearwardly from the trigger 710 and molded integrally therewith is a lever 778 having two parallel tines 780 extending toward a rear of the mechanism chamber 744. Arranged extending perpendicularly from one of the tines 780 is a connecting bar 784.

Fitted slidable within the slots 748, 750, 752, 754 are valve plates 790, 792, 794, 796. The valve plates are guided by the slots and also by opposing pins 798, 800 at each valve plate within the mechanism chamber 744. The pins 798, 800 are located at each valve plate on both halves of the split housing 707, to guide the valve plates at opposite lateral edges.

Figure 11:
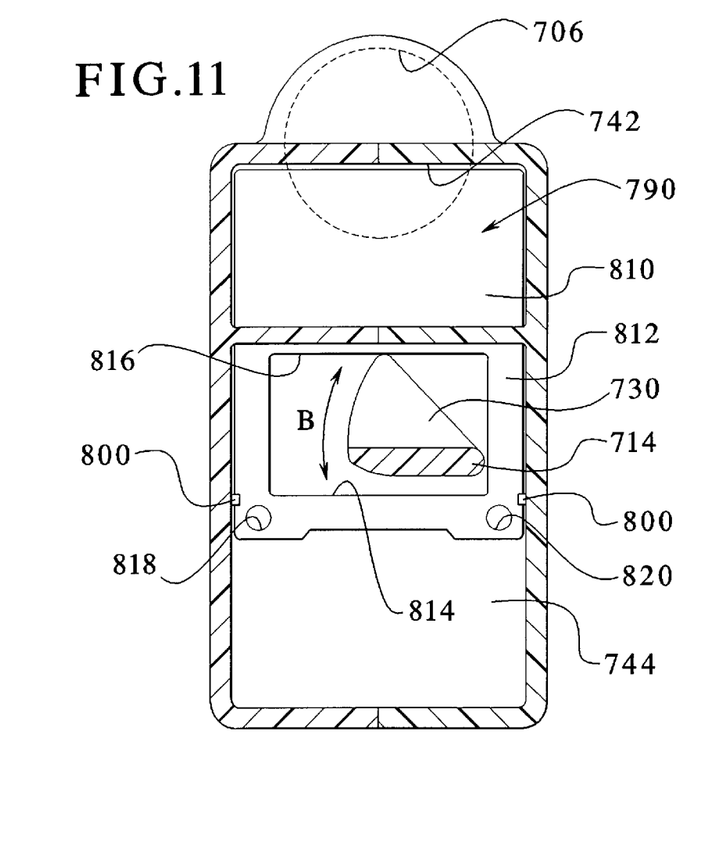
FIG. 11 is a sectional view taken generally along line XI—XI of FIG. 9.

The rail 714 is guided for axial rotation in axial movement at positions 804, 806 on the housing 707. As illustrated in FIG. 11, the valve plate 790 provides a solid upper portion 810 and a lower portion 812 having a rectangular opening 814. The rail penetrates the rectangular opening 814 and the cam 730 is positionable to underlie a top surface 816 of the opening 814. Upon rotation of the cam 730 upwardly as shown in FIGS. 9 and 11 under influence of the leaf spring 770, the solid portion 810 closes off the flow channel 742 to block flow. Two apertures 818, 820 are formed through the bottom portion 812 of the plate 790. These apertures are not used in the plate 790. However, in order to economize during manufacturing, in order to make all of the valve plates 790, 792, 794 and 796 universal and identical, the apertures 818, 820 are formed in every plate. However, only on the shut off plate 796 are these apertures functional.

As shown in FIG. 9 and 11 with the trigger in a relaxed position, the cam 730 has forced the plate 790 upward to close off the flow channel 742. The plate portion 810 rests against the seal bar 756 at its free end. As shown in FIG. 9 in this position of the rail 714, the cam 732 and 734 are not in registry with the corresponding opening 814 of the respective other plates 792, 794. Thus, these plates remain downwardly retracted and not protruding within the flow channel 742. Thus, under influence of gravity, the channel 742 can be filled with material for being dispensed, filled up to the plate 790.

As shown in FIG. 10, when the trigger 710 is squeezed against the handle 712 against the urging of the leaf spring 770 the lever 778 pivots about the pin 774 upwardly and the connector bar 784 is urged upwardly to pivot upwardly the crank bar 738 to axially rotate the rail 714. As viewed in FIG. 11, the rail thus rotates along the arcuate direction B, the cam 730 rotates downwardly to release the plate 790 downwardly to clear the flow channel 742. The tines 780a, 780b pivot upwardly to force the shut off valve plate 796 into the flow channel 742 to shut off material flow into the valve means during dispensing.

As described above, the plates 792, 794 remained inactive. However, a selected plate of the plates 790, 792, 794 can be selected by moving the rail in its axial direction X—X. The rail 714 provides pin protrusions 830, 832 for manual axial movement of the rail. The rail moves according to the positions defined by the notches 720 with respect to the clasp 722. The cams 730, 732, 734 are spaced that each of three annular notches 720 corresponds to only one of the cams registering with one of the respective plates, with the respect of other two cams in a non-registered position. A fourth notch 720a is available wherein all cams 730, 732, 734 are in a non-registered axial position with regard to their respective valve plates 790, 792, 794 and only the shut off valve plate 796 is operable. This corresponds to a "manual" means of operating the dispensing 700 wherein a constant flow of material can be achieved until the trigger 710 is squeezed to close the shut off valve plate 796.

Figure 12:
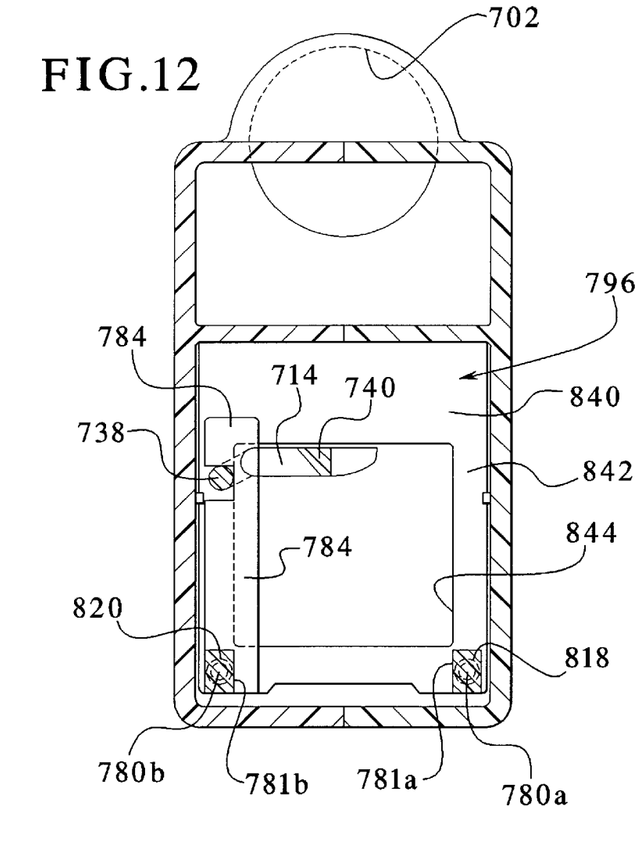
FIG. 12 is a sectional view taken generally along line XII—XII of FIG. 9.

FIG. 12 shows the shut off plate 796 including an upper solid plate portion 840 and a lower portion 842 having a rectangular opening 844, which in the shut off plate 796 is not used except for allowing a space for the pin portion 830 to move freely therein. The apertures 818, 820 are slidable engaged therein by the tines 780a, 780b, the rectangular cross sections 781a, 781b are bar shaped base members for the cylindrical tines 780a, 780b shown in FIG. 9.

Figure 13:
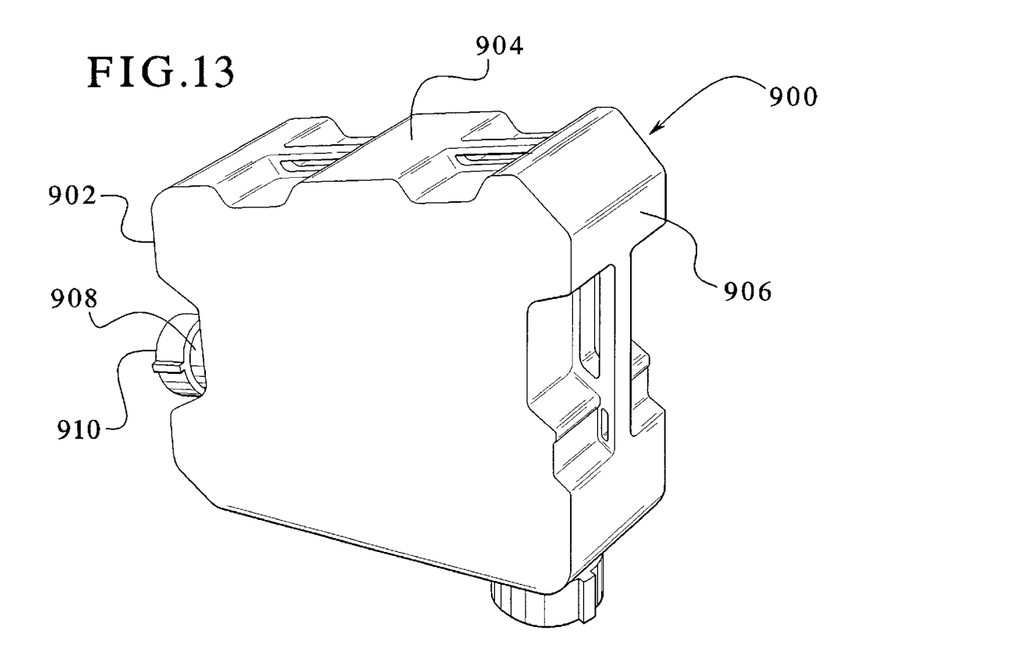
FIG. 13 is a back side perspective view of another container.
Figure 14:
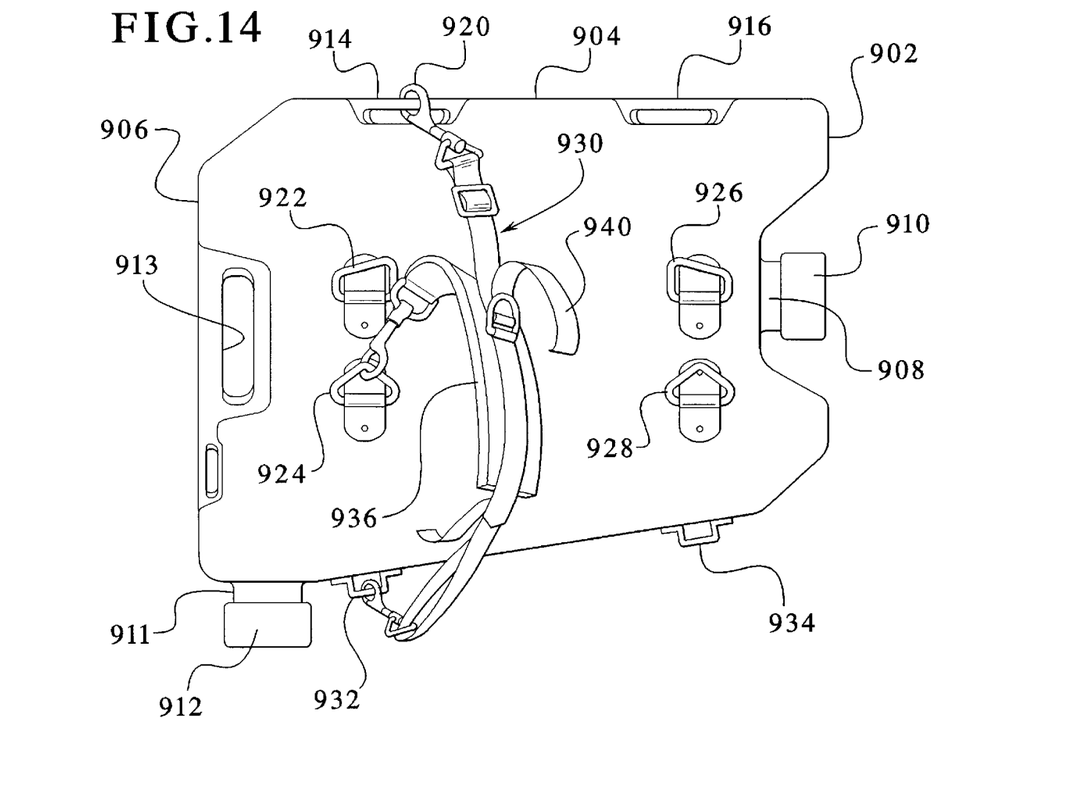
FIG. 14 is a front side perspective view of the container of FIG. 13.

FIG. 13 shows an exemplary embodiment of a material container 900 which can be used in the arrangement shown in FIG. 1. According to this embodiment, the container is provided having three flat datums 902, 904, 906 which conform to a rectangular shape to provide for efficient packing of a plurality of the containers into a field truck for delivery to field workers. An inlet nozzle 908 is provided recessed from the datum 902 for non-interference during close packing. The nozzle is closed by a cap 910. An outlet 911 is provided closed by the cap 912. A handle portion 913 is provided recessed from the datum 906 which also permits efficient packing of multiple containers.

According to the invention, formed flush with the top datum 904 are lugs 914, 916 for engagement by a harness latch 920. Applied onto a front of the container 900 are rings 922, 924, 926, 928 which allow for selective adjustment of a harness 930 for the size of the worker. Only one harness 930 is shown although typically two would be provided, one for each shoulder. As shown, the harness is a three point harness which also hooks to a bottom catch 932, and an additional bottom catch 934 for the respective other harness (not shown). A shoulder cushion 936 is provided and the harness 930 can be tightened up to the worker via a strap free end 940 of the harness 930. With the harness thus adjusted for the worker, it can be arranged in an upright position for proper gravity flow and can actually be raised to a level with the datum 904 considerable elevated above the worker's shoulder level.

Although the present invention has been described with reference to a specific embodiment, those of skill in the art will recognize that changes may be made thereto without departing from the scope and spirit of the invention as set forth in the appended claims.

I claim as my invention:

1. A dispenser assembly for dispensing predetermined amounts of dry material, said assembly comprising:

a container having a hollow interior and structurally adapted to hold the dry material to be dispensed therein and including an outlet formed in a lower end of the container;

mounting means connected to said container on an exterior portion thereof and structured for supporting said container in an operative position on a carrier;

an elongate dispensing hose connected to said outlet;

a valve means in line with said hose and having a handle extending perpendicularly from said hose and a trigger lever extending adjacent said handle, said handle and said trigger lever sized and adapted to be gripped together by the carrier's hand, squeezing of said trigger lever to said handle activates said valve means for dispensing a predetermined volume of material through said elongate hose; and wherein said valve means comprises a first and a second valve member attached together by a bar engageable by said trigger lever, said valve members in spaced relation to one another along a predetermined length of said hose, said first and second valve members alternately positionable into and out of said hose in flow blocking relation to material within said hose and thereby defining a respective closed position of each of said first and second valve members; and wherein said valve means comprises a third valve member located between said first and second valve members along said bar and second and third valve members alternatively selectable for operation to define two different predetermined lengths of said hose.

2. An assembly as in claim 1 wherein said container further comprises an inlet nozzle recessed on a side of said container and a bottom wall sloped toward said outlet.

3. An assembly as in claim 1 further comprising a biasing means connected between said bar and an exterior surface of said hose and adapted to normally bias said first valve member into said closed position adjacent a down stream end of said holding chamber.

4. An assembly as in claim 1 wherein each of said valve members comprises a plate alternately movable between an opened and closed position relative to flow of material through said conduit, each of said plates having a diameter at least minimally greater than an internal diameter of said holding chamber.

5. An assembly as in claim 4 wherein each of said plates are alternately disposable into said holding chamber in substantially perpendicular relation to a longitudinal axis of said holding chamber when in said closed position.

6. An assembly as in claim 5 wherein each of said plates are alternately disposable exteriorly of said conduit and holding chamber when in said opened position.

7. An assembly as in claim 1 wherein said container comprises flat sides, a flat front face, a flat back face, and a flat top, all without protrusions.

8. An assembly as in claim 1 wherein said mounting means comprises parallel backstraps laterally arranged on a front side of said container, and said container comprises recessed slots wherein said straps can be held therein to prevent protrusion outward of said front side when said straps are not in use.

9. A dispenser assembly designed to dispense predetermined amounts of dry material, said assembly comprising:

a hard shell container having a hollow interior and structurally adapted to hold the dry material to be dispensed therein and including a outlet formed in a lower end of the container;

shoulder straps connected to said container on an exterior portion thereof and structured for supporting said container in an operative position on a carrier;

a flexible dispensing conduit connected to said outlets;

a valve means in line with said conduit and having a perpendicular handle and an adjacent trigger lever extending from said conduit, movement of said trigger lever toward said handle activating said valve means for dispensing a measured volume of material through said conduit; and wherein said valve means comprises an elongate holding chamber, a shut off valve at an inlet to said holding chamber and a plurality of dispensing valves downstream of said shut off valve and means for selectively activating one of said dispensing valves to open upon actuation of said trigger lever simultaneously with closing of said shut off valve.

10. An assembly as in claim 9 wherein said means for selectively activating comprises a pivotable rail, pivotable by activation of said trigger lever and having a first cam selectively positionable under a select one of the dispensing valves to move said dispensing valve upon pivoting of said rail.

11. An assembly as in claim 10 wherein said first cam is fixed to said rail and said rail is translatable to position said first cam to said dispensing valve.

12. An assembly as in claim 11 wherein said means comprises at least one additional cam spaced along said rail from said first cam and positionable under a select valve upon translation of said rail.

13. An assembly as in claim 10 wherein said rail protrudes externally of said valve means for translation by a user.

14. An assembly as in claim 9 wherein said hard shell container provides a flat top and flat sides with no protrusions.

15. A fertilizer dispenser assembly for dispensing predetermined amounts of dry fertilizer material in the field, said assembly comprising:

a container having a hollow interior and structurally adapted to hold the dry material to be dispensed therein and including an outlet formed in a lower end of the container;

mounting means connected to said container on an exterior portion thereof and structured for supporting said container in an operative position on a field worker's back;

an elongate dispensing hose connected to said outlet;

a valve means having a hollow tublar body in line with said hose, manually actuatable by the field worker and having an inlet disk and an outlet disk spaced apart along a predetermined length of said body and actuatable to translate together in a same parallel direction to simultaneously open said body at one of said inlet and outlet disks and close said body at the respective other of said inlet and outlet disks, said valve means having an actuator bar arranged parallel to said tubular body and connecting said disks, said actuator bar spaced from said tubular body a distance sized such that a human hand can grip the tubular body and actuator bar together, squeezing of said tubular body and actuator bar together actuating said inlet and outlet disks to dispense said fertilizer held between said disks.

16. An assembly as in claim 15 wherein said bar is biased away from said hose by two parallel springs, and said disks all arranged at least partially engaged in slots formed in said body wherein translation of said bar toward said body simultaneously slides said inlet disk into said body to block flow through said body and slides said outlet disk out of said body on a side of said body opposite said bar to open flow out of said body.

17. An assembly as in claim 16 wherein said bar has finger gripping formations thereon.

18. A dispensing valve comprising:

an elongate cylindrical barrel having hose connecting means at opposite axial ends, and a first slot and a second slot, said first and second slots arranged at least partially through a circumference of said barrel and spaced apart from each other along the length of said barrel;

a first disk arranged insertable through said first slot into said barrel, and a second disk arranged insertable through said second slot into said barrel; and a lever connecting said first disk and said second disk, said lever translatable toward said barrel to insert said first disk through said first slot and into said barrel and simultaneously retract said second disk out of said barrel through said second slot, said lever translates said first disk and said second disk in an identical direction with respect to said barrel, said lever arranged parallel to said barrel, and spaced from said barrel a distance sized to allow a human hand to grip said barrel and lever together to translate said lever toward said barrel; and first and second springs arranged between said lever and said barrel to bias said lever away from said barrel, said springs arranged at opposite ends of said lever.

19. A dispensing valve comprising:

an inlet connection and an outlet connection;

a material flow channel between the inlet and outlet connections, said flow channel having a plurality of slots on one side thereof;

a shut off valve plate selectively protrudable into said flow channel, adjacent said inlet connection;

a plurality of discharge valve plates, each of said discharge valve plates selectively registerable into one of said slots to close said material flow channel;

a mechanical means for selecting one of said discharge valve plates; and a mechanical means including a handle and a trigger lever sized and adapted to be gripped together by human hand and a cam means actuated by movement of said trigger lever for moving said selected one of said discharge valve plates into said flow channel while moving said shut off valve plate out of said flow channel.

20. A dispensing valve comprising:

an inlet connection and an outlet connection;

a material flow channel between the inlet and outlet connections, said flow channel having a plurality of slots on one side thereof;

a shut off valve plate selectively protrudable into said flow channel, adjacent said inlet connection;

a plurality of discharge valve plates, each of said discharge valve plates selectively registerable into one of said slots to close said material flow channel;

a means for selecting one of said discharge valve plates; and a means for moving said selected one of said discharge valve plates into said flow channel while moving said shut off valve plate out of said flow channel; and wherein said means for selecting comprises an axially movable rail carrying a plurality of cams, at a select axial position of said rail only one of said cams alienable with only one of said discharge valve plates and said means for moving moves said one of said cams against said one respective discharge valve.

21. The discharge valve according to claim 20 wherein said means for moving comprises a trigger operatively connected to said rail and said rail axially rotatable to move said cams, movement of said trigger rotates said rail.

22. The discharge valve according to claim 21 wherein said trigger comprises a lever to actuate an offset portion of said rail to cause axial rotation of said rail, and said trigger comprises a second lever connected to said shut off valve to translate said shut off valve into said flow channel.

23. A back mounted granular fertilizer container, for field dispensing fertilizer, comprising:

a front wall, back wall, top wall, bottom wall and first and second side walls forming a compartment;

an outlet nozzle on said bottom wall;

said bottom wall sloped to said outlet nozzle;

an inlet nozzle recessed into one of said side walls and a recessed handle on an opposite side wall; and recessed first lugs formed in said top wall without projecting outward past said top wall second lugs on said bottom wall and third lugs on said front wall for connecting shoulder straps.

24. A back mounted granular fertilizer container, for field dispensing fertilizer, comprising:

a front wall, back wall, top wall, bottom wall and first and second side walls forming a compartment;

an outlet nozzle on said bottom wall;

said bottom wall sloped to said outlet nozzle;

an inlet nozzle recessed into one of said side walls and a recessed handle on an opposite side wall;

two first lugs on said top wall;

two second lugs on said bottom wall;

two third lugs on said front wall; and two three point connection type shoulder straps, each connected to one of said first, second and third lugs respectively.

25. The container according to claim 24 further comprising two fourth lugs on said front wall each located above one of said third lugs respectively.

* * * * *